US005748893A

United States Patent [19]
Hirata et al.

[11] Patent Number: 5,748,893
[45] Date of Patent: May 5, 1998

[54] NETWORK INTERFACE APPARATUS

[75] Inventors: Tetsuhiko Hirata; Minoru Koizumi; Masayo Nagano, all of Yokohama; Yoshiaki Adachi, Hatachiota; Hiroshi Wataya, Hitachinaka; Ken Onuki, Hitachi, all of Japan

[73] Assignee: Hitachi, Ltd., Tokyo, Japan

[21] Appl. No.: 739,436

[22] Filed: Oct. 29, 1996

[30] Foreign Application Priority Data

Nov. 1, 1995 [JP] Japan ................. 7-284956

[51] Int. Cl.[6] ........................... G06F 13/00
[52] U.S. Cl. ........................... 395/200.3
[58] Field of Search ............... 364/DIG. 1 MS File, 364/DIG. 2 MS File; 395/180, 181, 200.3, 200.5, 200.69, 200.8, 308; 370/360

[56] References Cited

U.S. PATENT DOCUMENTS

| | | | |
|---|---|---|---|
| 5,329,521 | 7/1994 | Walsh et al. | 370/360 |
| 5,442,754 | 8/1995 | Datwyler et al. | 395/308 |
| 5,509,127 | 4/1996 | Datwyler et al. | 395/308 |

OTHER PUBLICATIONS

Basic Knowledge of Local Area Network, John E. McNamara, Apr. 20, 1986, published by Kyoritsu Shuppan Co., Ltd.

"Computer Network", Gyo Yagi et al, Jun. 15, 1983, published by Asakura Shoten Co., Ltd.

*Primary Examiner*—Robert B. Harrell
*Attorney, Agent, or Firm*—Fay,Sharpe,Beall,Fagan,Minnich & McKee

[57] ABSTRACT

It is designed to connect a duplicated LAN to a network terminal such as a controller having a standard serial or parallel interface, a computer having only one LAN interface, or a computer having only one communication line interface.

The network interface apparatus for connecting a network terminal and a duplicated LAN comprises a device for controlling interfaces with the network terminal and the LAN transmission line of each of the duplicated LAN, a buffer, and a sending device to both, and the data from the network terminal is buffered in the buffer, and when the buffered data reaches a fixed amount, the data is sent to both LANs of the duplicated LAN. On the other hand, with respect to the data received from each LAN transmission line of the duplicated LAN, only the data which is judged as earlier arrival data is sent to the network terminal.

16 Claims, 10 Drawing Sheets ial or parallel interface, a computer having only one LAN connection interface, or a computer having only one communication line connection interface to a LAN having a duplicated transmission line for high reliability and more particularly to a network interface apparatus suited to a computer control system for connecting a computer or controller requiring high reliability to a network and automatically controlling a plant.

Conventionally, the network interface apparatus has been developed as a terminal concentrator for connecting a terminal equipment having no processing capacity or a small amount of capacity, if any, to various host computers.

As an example of a typical network interface apparatus, there is an apparatus having the following function. Namely, when an ASCII character is sent or received to or from a network interface apparatus from a terminal equipment via an RS-232C interface as a flow of a series bit, the network interface apparatus executes the protocol processing program necessary to connect it to a LAN for it and sends or receive data to or from a target host computer via the LAN. As an example of a network using such a network interface apparatus, there is Net/One manufactured by Ungermann-Bass, Ltd. Net/One makes communication between many various types of computers and terminals possible, so that each processor is accommodated in a Net/One network by an adapter unit which is called an NIU (network interface unit). This NIU is a programmable unit comprising a transceiver controller, a network/application processor, and portions corresponding to various electrical interfaces.

Net/One can connect various terminals, computers, and devices by a standard interface and main interfaces provided are RS-232C, RS-422, 423, and 449, and IEEE488 (GPIB), etc. The terminal concentrator is described in detail in John E. McNamara, "Basic Knowledge of Local Area Network", Apr. 20, 1986 (translated by Hiroyuki Watabe) published by Kyoritsu Shuppan Co., Ltd. and Net/One is described in detail in Gyo Yagi and Kakai Teshigawara, "Computer Network", Jun. 15, 1983 published by Asakura Shoten Co., Ltd.

The aforementioned prior arts assume network connection of an information device in an office, so that they take high reliability of a system in the control system field into account but do not take connection of a duplicated network which is often used into account. Therefore, only one of a duplicated LAN can be connected via a network interface apparatus of the prior art and a problem arises that it is necessary to provide two LAN adapters in one computer. Another problem arises that when a computer has only one interface with a communication line, it cannot be connected to a duplicated LAN.

SUMMARY OF THE INVENTION

The present invention is designed to eliminate the difficulties of the prior arts mentioned above and an object of the present invention is to provide a network interface apparatus for connecting a network terminal such as a controller having a standard serial or parallel interface to a highly reliable system using a duplicated LAN.

Another object of the present invention is to provide a network interface apparatus for connecting a computer having only one LAN interface to a highly reliable system using a duplicated LAN.

Still another object of the present invention is to provide a network interface apparatus for connecting a computer having only one communication line installed and only one communication line interface to a highly reliable system using a duplicated LAN.

To accomplish the above objects, the invention constitution relating to a network interface apparatus of the present invention is that the network interface apparatus for connecting a network terminal and a duplicated LAN comprises a means for controlling an interface with the network terminal, a means for controlling an interface with the LAN transmission line of each of the duplicated LAN, a means for buffering data from the network terminal, a means for sending the data to each LAN transmission line from the data buffering means, and a means for sending the data received from each LAN transmission line to the network terminal, and the data from the network terminal is buffered in the data buffering means, and when the buffered data reaches a predetermined amount, the data is sent to both LANs of the duplicated LAN, and on the other hand, the data received from each LAN transmission line of the duplicated LAN is compared in the competition relation thereof, and only the data which is judged as earlier arrival data is sent to the network terminal, and the interface duplicated so as to connect to this duplicated LAN is controlled.

More in detail, in the aforementioned network interface apparatus, the data sent from each of the duplicated LAN is divided into several sending units, and the comparison of competition relation to be executed in the network interface apparatus is executed by the sequence number assigned to each sending unit, and these divided sending units are assembled as one united data and then sent to the network terminal.

In detail, in the aforementioned network interface apparatus, one transmission line of the duplicated LAN and the other transmission line are classified as master and sub and sending of data to a transmission line of the duplicated LAN from the data buffering means is executed only to the transmission line classified as master.

Still in detail, the network terminal is a controller in a computer control system.

Further in detail, in the aforementioned network interface apparatus, the network terminal contains a LAN adapter.

Further in detail, in the aforementioned network interface apparatus, the network terminal is connected to this network interface apparatus via a communication line.

By the aforementioned constitution, data fetched in the network interface apparatus by a serial or parallel interface from the network terminal such as a controller is stored in the buffer in the network interface apparatus until the data reaches the data unit to be sent to the LAN. This network interface apparatus sends the same data to each LAN. When data is received from the LAN side, only the earlier arrival data among the data received duplicatedly is transferred to the network terminal.

As mentioned above, even if the network terminal on the sending side and receiving side is, for example, a controller, a computer having only one LAN interface, or a computer having only one communication line interface, communication can be executed under the conventional specification without considering the duplicated LAN.

DESCRIPTION OF THE PREFERRED EMBODIMENTS

Each embodiment of the present invention will be explained hereunder with reference to FIGS. 1 to 11.
Embodiment 1

The first embodiment of the present invention will be explained hereunder with reference to FIGS. 1 to 9. Firstly, the constitution of a network system using the network interface apparatus of this embodiment will be explained with reference to FIG. 2.

Figure 2:
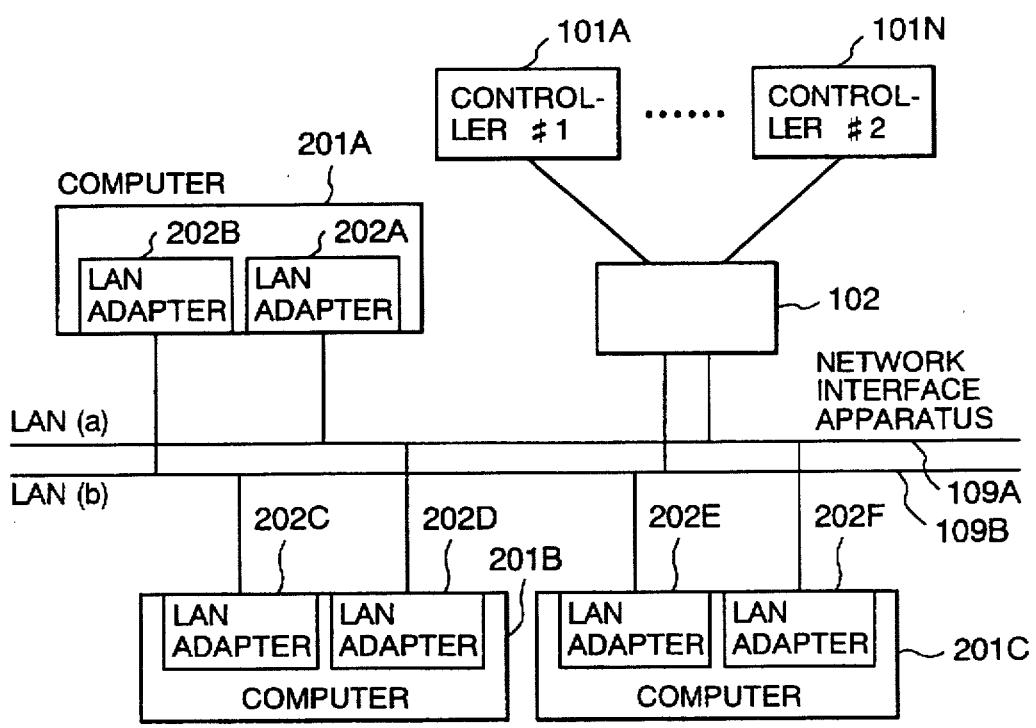
FIG. 2 is a block diagram of a network system using the network interface apparatus in the first embodiment of the present invention.

FIG. 2 is a block diagram of a network system using the network interface apparatus in the first embodiment of the present invention.

As shown in FIG. 2, in the network system, computers 201A, 201B, and 201C are connected to duplicated LAN (a) 109A and LAN (b) 109B by two LAN adapters "202A and 202B", "202C and 202D", and "202E and 202F" respectively.

A plurality of controllers 101A to 101N are connected to the duplicated LAN (a) 109A and LAN (b) 109B by a network interface apparatus 102. This embodiment is an example that a network interface apparatus of a computer control system is applied and the controller used as a network terminal is a device for controlling a plant. The computers 201A, 201B, and 201C have the same constitution and hereinafter the reference numeral may be described as 201 as a general term for them. The LAN adapters 202A, 202B, 202C, 202D, 202E, and 202F also have the same constitution and hereinafter the reference numeral may be described as 202 as a general term for them.

Next, the hardware constitution of the network interface apparatus in this embodiment will be explained with reference to FIG. 1.

Figure 1:
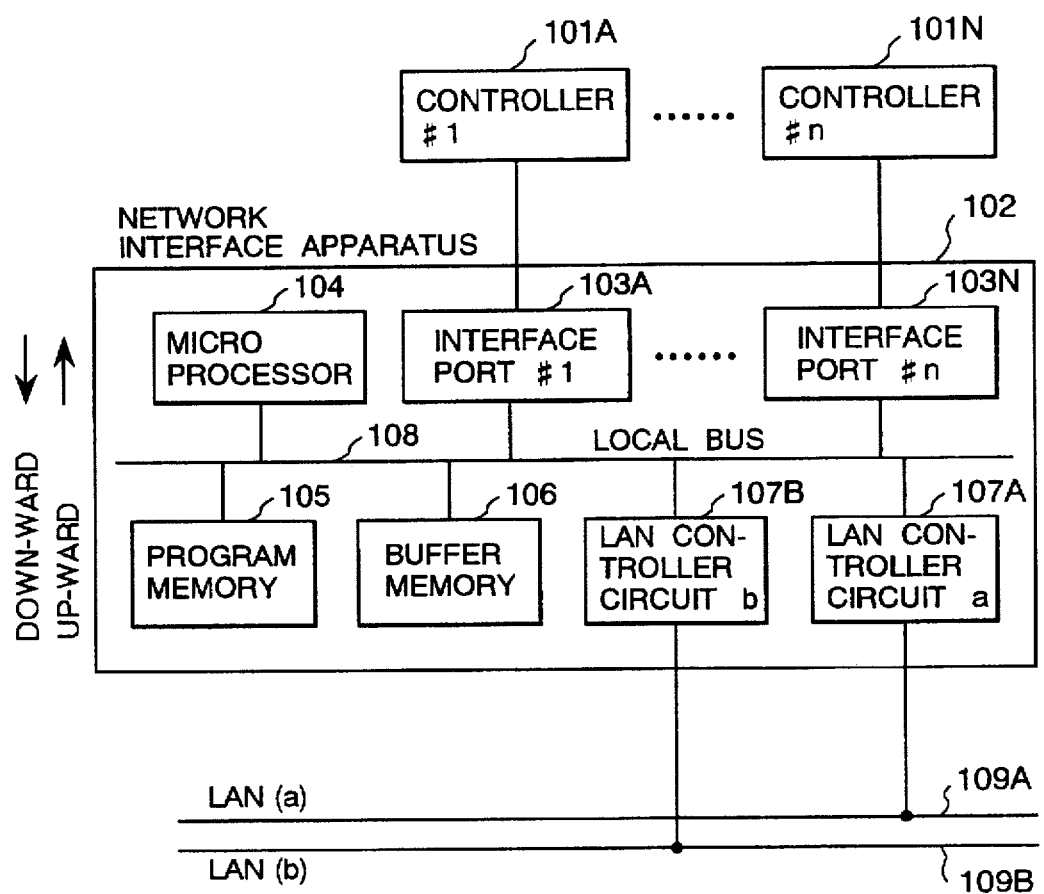
FIG. 1 is a block diagram showing the hardware constitution of the network interface apparatus in the first embodiment of the present invention.

FIG. 1 is a block diagram showing the hardware constitution of the network interface apparatus in the first embodiment of the present invention.

In the network interface apparatus 102, interface ports 103A to 103N, a LAN control circuit a (107A), a LAN control circuit b (107B), a buffer memory 106, a micro processor 104, and a program memory for storing programs 105 are connected to a local bus 108 and control and data transfer are executed by the local bus 108.

The interface ports 103A to 103N are ports used to relay sending and receiving of data with the controllers and the interface port 103#i corresponds to the controller #i.

The LAN transmission line is duplicated into the LAN (a) transmission line 109A and the LAN (b) transmission line 109B, and the LAN control circuit a (107A) is a circuit for executing control for sending and receiving of data with the LAN (a) transmission line 109A, and the LAN control circuit b (107B) is a circuit for executing control for sending and receiving of data with the LAN (b) transmission line 109B.

The buffer memory 106 is a buffer memory for storing data in the up-ward and down-ward directions. The reason of installation of this memory is that it is necessary to adjust the speed of data from a computer and the speed of data on the transmission line of the network and to store the data so as to resend it.

The control of the network interface apparatus is executed by the micro processor 104 according to a program stored in the program memory for storing programs 105. "Up-ward" is the direction in which data is received from the duplicated LAN and relayed to the controller and "down-ward" is the direction in which data is fetched from the controller and sent to the duplicated LAN. (The same may be said with the subsequent description of the specification.) Next, the function and operation of the network interface apparatus in this embodiment will be explained with reference to FIGS. 3 to 7.

Firstly, the outline of the function of the network interface apparatus in this embodiment will be explained with reference to FIG. 3.

Figure 3:
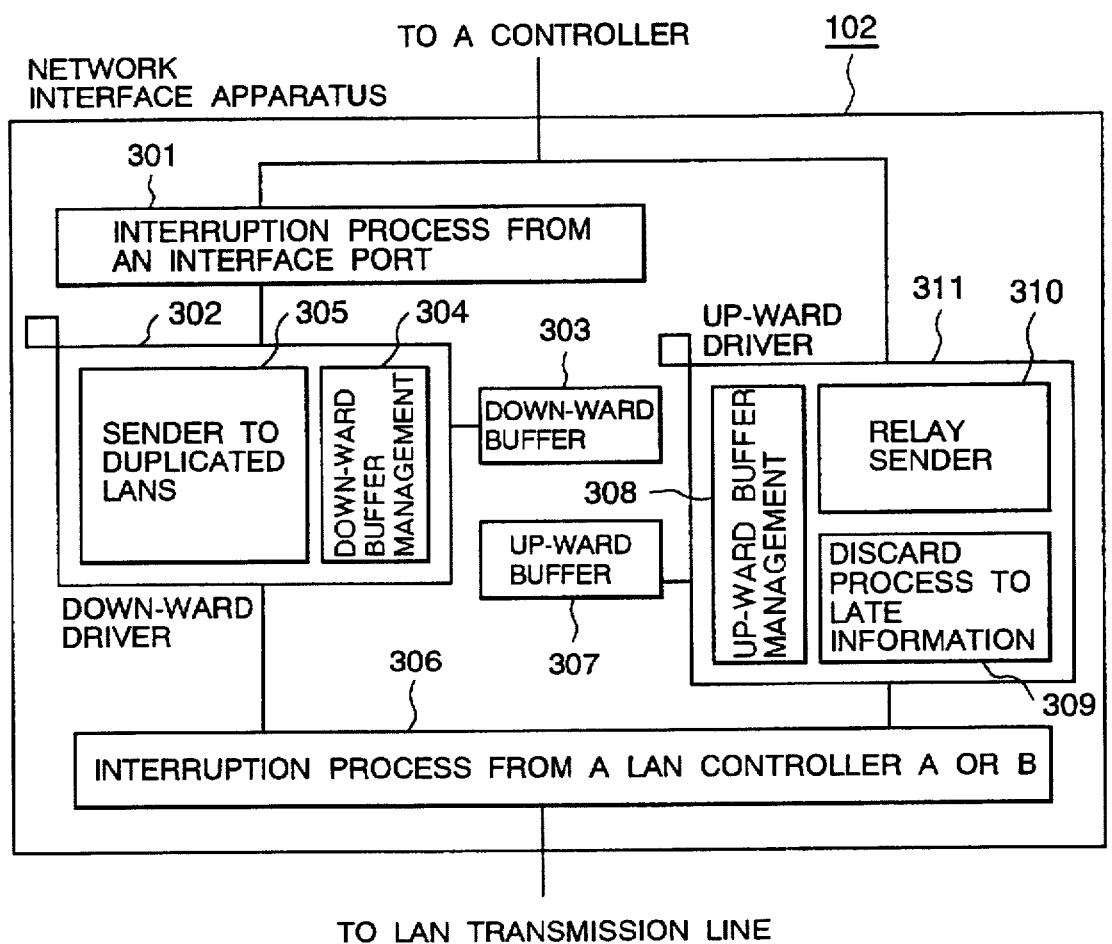
FIG. 3 is a conceptual diagram for explaining the function of the network interface apparatus in the first embodiment of the present invention.

FIG. 3 is a conceptual diagram for explaining the function of the network interface apparatus in the first embodiment of the present invention.

The processing function in the network interface apparatus comprises an interruption process from an interface port 301, a down-ward driver 302, an interruption process from a LAN control circuit a or b 306, and an up-ward driver 311.

The down-ward driver 302 comprises a down-ward buffer management function 304 for managing a downward buffer 303 and a sending function to a duplicated LAN 305.

The up-ward driver 311 comprises an up-ward buffer management function 308 for managing an up-ward buffer 307, a discard process to late information of received data from the duplicated LAN 309, and a relay sending process to a controller 310.

Each processing function will be explained hereunder sequentially.

Firstly, the interruption process from an interface port will be explained in the order shown in FIG. 4.

Figure 4:
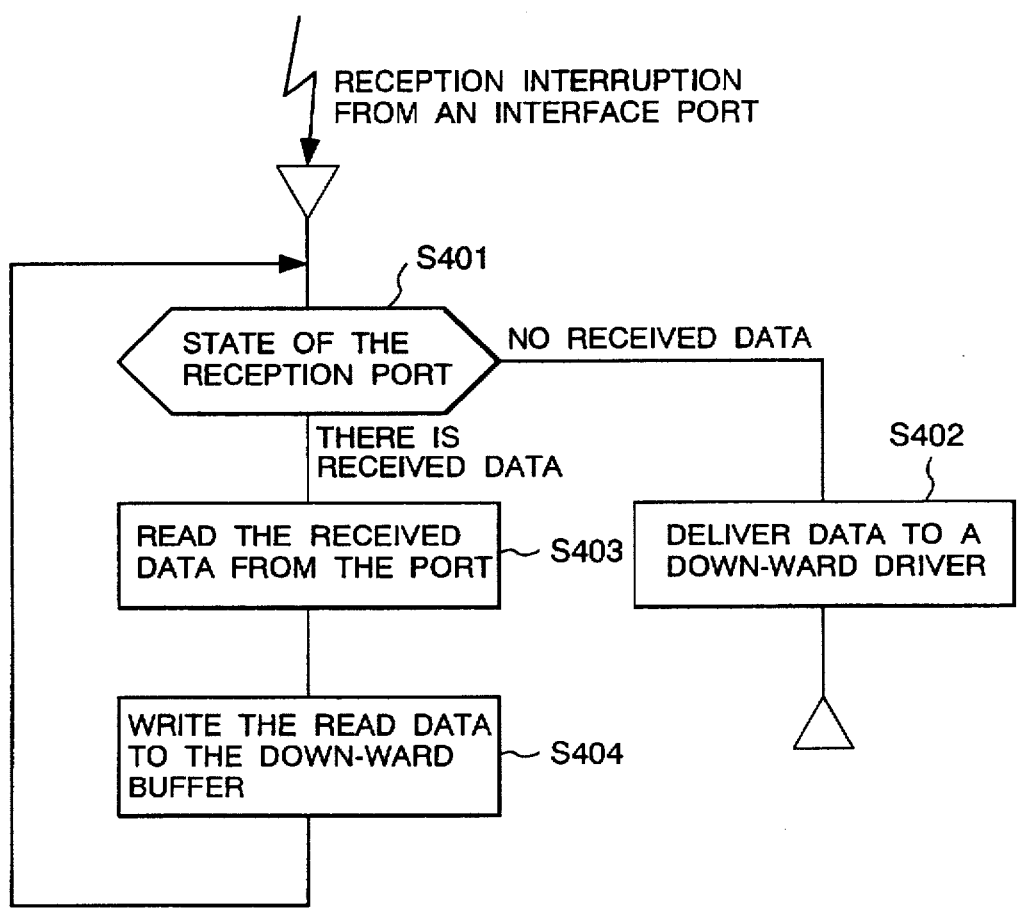
FIG. 4 is a flow chart showing the interruption process from an interface port.

FIG. 4 is a flow chart showing the interruption process from an interface port.

When an interruption is received from an interface port, the function refers to the status of the reception port from the status register (Step 401). As a result, when there is the received data from the controller in the interface port, the function reads it (Step 403). The function writes the read data into the down-ward buffer (Step 404).

The function continues these processes until no data reaches the reception port and when no received data reaches the reception port, the function delivers the data stored in the down-ward buffer to the downward driver (Step 402).

Next, the process of the down-ward driver will be explained in the order shown in FIG. 5.

Figure 5:
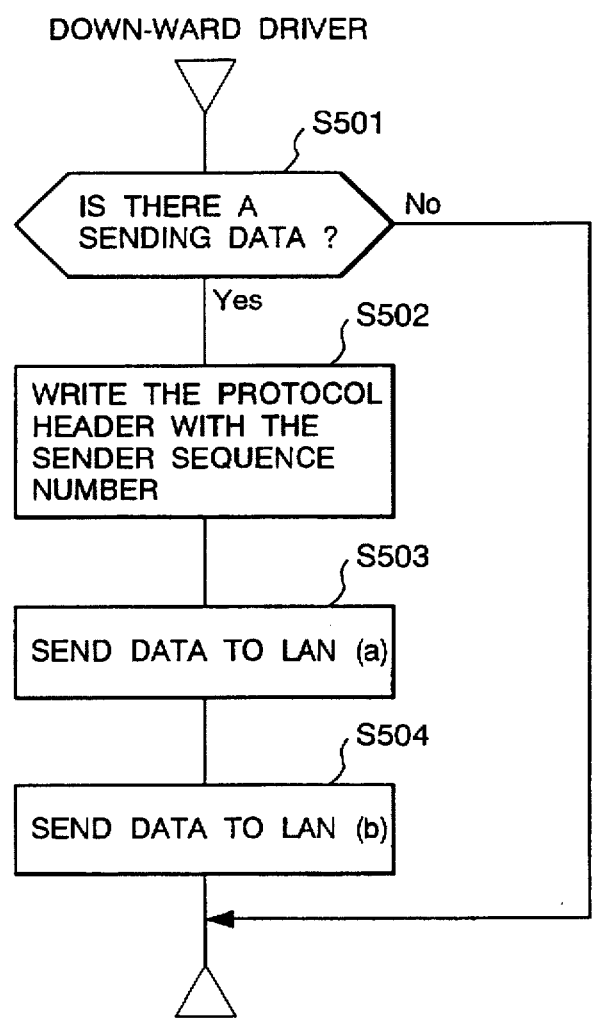
FIG. 5 is a flow chart showing the process of a down-ward driver.

FIG. 5 is a flow chart showing the process of the down-ward driver.

The down-ward driver judges whether there is data to be sent or not (Step 501). As a result, when there is data, the down-ward driver writes the message sequence number and sender sequence number in the protocol header (Step 502). The message sequence number and sender sequence number are a base for judgment of missing or misordering of sending data and duplication of data in the duplicated LAN.

When the down-ward driver generates the protocol header like this, it sends data to the LAN (a) which is one of the duplicated LAN (Step 503) and then sends data to the LAN (b) which is the other LAN (Step 504).

Next, the interruption process from the LAN control circuit (a) and the LAN control circuit (b) will be explained in the order shown in FIG. 6.

Figure 6:
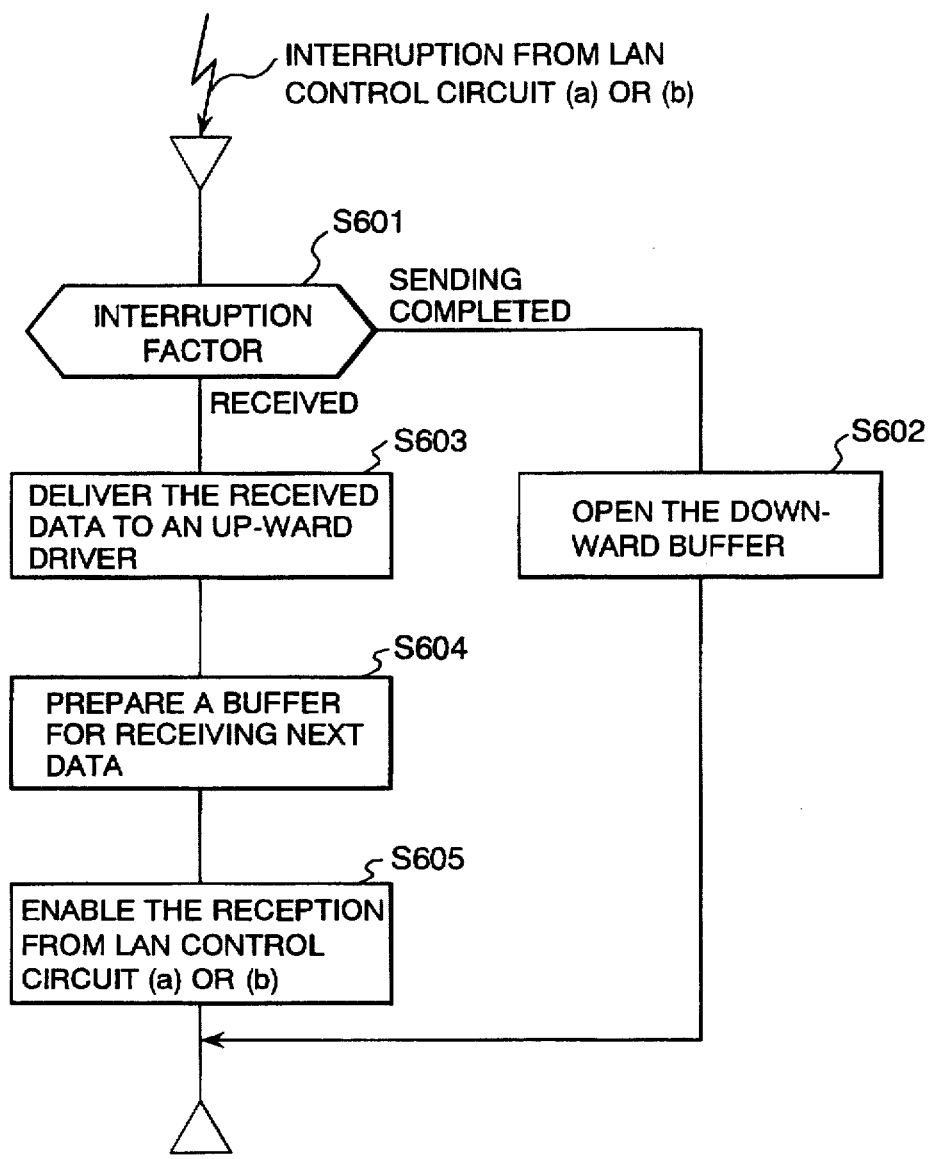
FIG. 6 is a flow chart showing the interruption process from a LAN control circuit (a) or (b).

FIG. 6 is a flow chart showing the interruption process from the LAN control circuit (a) or (b).

When an interruption is received from the LAN control circuit (a) or (b), the function judges the interruption factor (Step 601).

When the result is sending completion, the function releases the down-ward buffer used for sending to the LAN (Step 602). When the result is reception notification, the function delivers the received data to the up-ward driver (Step 603).

Thereafter, the function prepares a buffer for receiving the next data from the LAN (Step 604) and puts the LAN control circuit (a) or (b) into the reception ready state (Step 605).

Next, the process of the up-ward driver will be explained in the order shown in FIG. 7.

Figure 7:
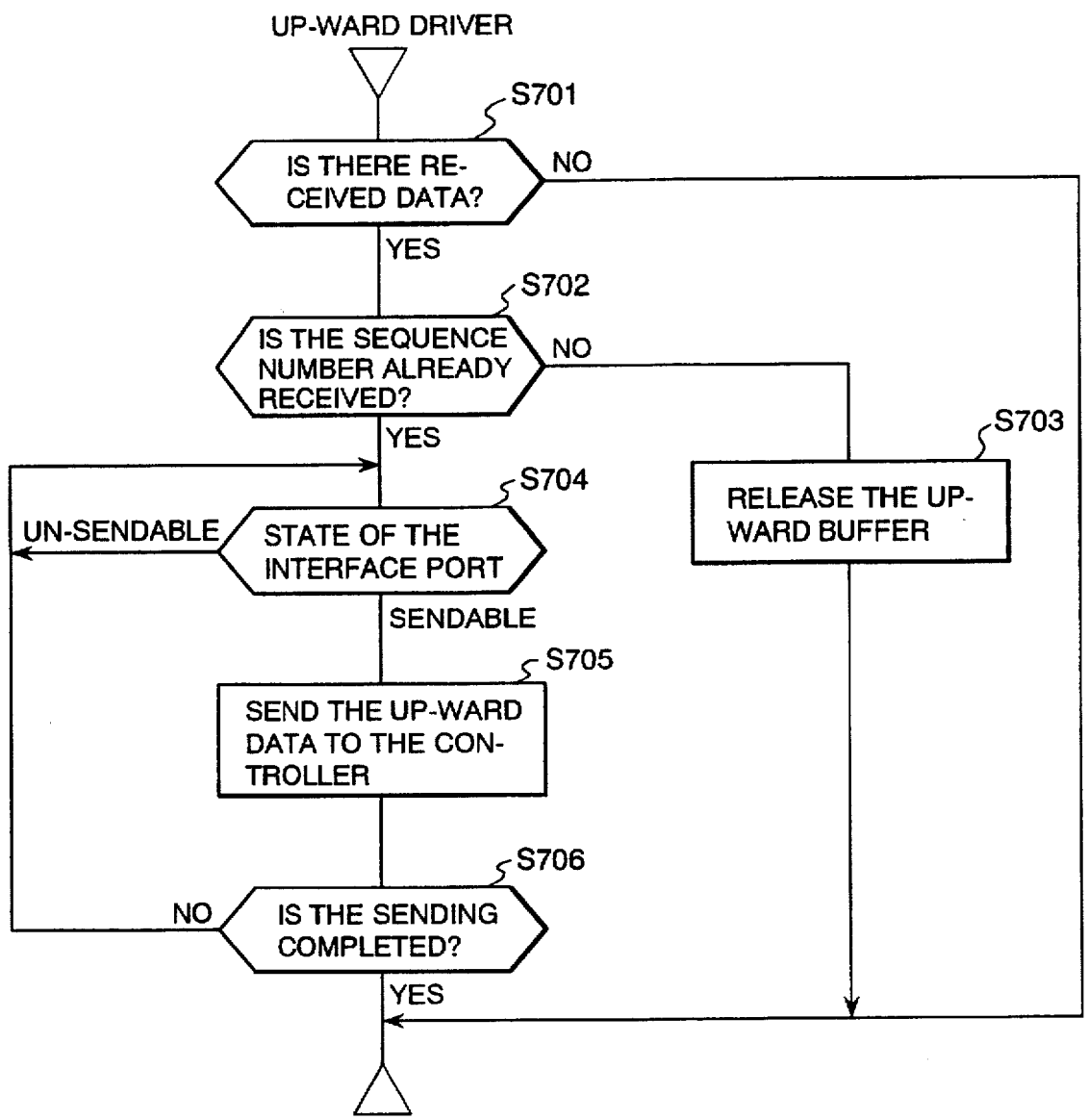
FIG. 7 is a flow chart showing an up-ward driver.

FIG. 7 is a flow chart showing the up-ward driver. The up-ward driver judges whether there is received data from the duplicated LAN or not (Step 701).

As a result, when there is received data, the up-ward driver judges whether the data is data received already or not by the message sequence number and sender sequence number (Step 702). Namely, when the data coincides with the message sequence number and sender sequence number, the up-ward driver judges it as received data.

When it is judged as received data, the up-ward driver does not send the data but releases the up-ward buffer (Step 703).

When it is judged as data not received, the up-ward driver sends the data to the controller. To send data to a controller, the up-ward driver judges the status of the interface port corresponding to the controller by the status register first (Step 704). As a result, when the interface port is in the write enable state, the up-ward driver writes data into the interface port corresponding to the controller (Step 705). When the interface port is in the write disable state inversely, the up-ward driver waits until the interface port enters the write enable state and repeats this process until the sending is completed (Step 706).

Next, the mechanism for reserving the high reliability by the duplicated LAN and the network interface apparatus in this embodiment will be explained with reference to FIGS. 8 and 9.

Firstly, the header format in a LAN frame will be explained with reference to FIG. 8.

Figure 8:
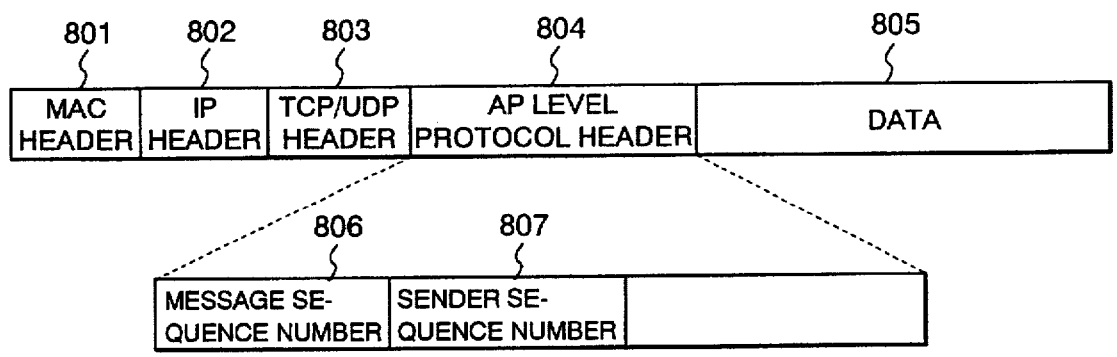
FIG. 8 is a schematic diagram showing a header format example in a LAN frame.

FIG. 8 is a schematic diagram showing a header format example in a LAN frame.

The LAN frame comprises a MAC header 801, an IP header 802, a TCP/UDP header 803, an AP level protocol header 804, and a data field 805.

A message sequence number 806 and a sender sequence number 807 are set in the AP level protocol header 804. As explained already, the two sequence numbers are a base for judgment of earlier or later arrival of data.

Next, the mechanism for realizing high reliability of data communication by the duplicated LAN will be explained in comparison with that of a conventional apparatus with reference to FIG. 9.

Figure 9:
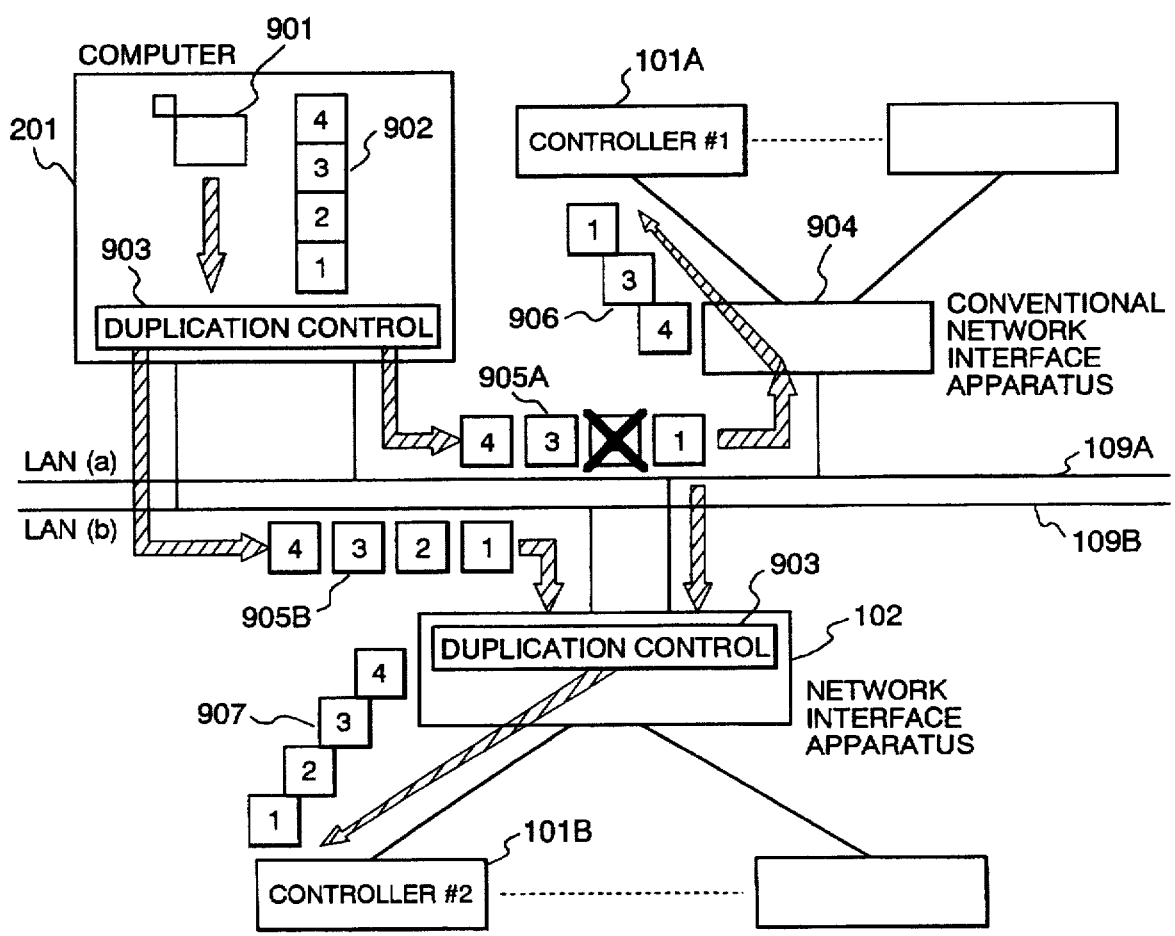
FIG. 9 is a schematic diagram showing a comparison of differences in the frame sending and receiving mechanism of a duplicated LAN between the network interface apparatus of this embodiment and a conventional network interface apparatus.

FIG. 9 is a schematic diagram showing a comparison of differences in the frame sending and receiving mechanism of the duplicated LAN between the network interface apparatus of this embodiment and a conventional network interface apparatus.

A case that a program 901 of the computer 201 sends a message to the controller #1 (101A) and the controller #2 (101B) as data using the duplicated LAN (a) 109A and LAN (b) 109B is considered. The controller #1 (101A) is connected to an interface apparatus 904 in the conventional example and the controller #2 (101B) is connected to the network interface apparatus 102 in this embodiment. The interface apparatus 904 in the conventional example is connected only to the LAN (a) 109A and the network interface apparatus 102 in this embodiment is connected to both the LAN (a) 109A and LAN (b) 109B.

A message 902 which is requested to send from the program 901 is divided into segments by a duplication controller 903 and each divided segment is assigned with a sender sequence number. In this example, the message is divided into 4 segments and sender sequence number 1, sender sequence number 2, sender sequence number 3, and sender sequence number 4 are assigned (hereinafter a segment to which sender sequence number i is assigned is described as "segment i"). (Each frame has a message sequence number for specifying a message. However, in this explanation, a case of one message is considered, so that the message sequence number is omitted.)

As shown in the drawing, it is assumed that among a message segment 905A sent using the LAN (a) 109A, the segment of sender sequence number 2 is lost. In this case, the network interface apparatus 904 in the conventional example is connected only to the LAN (a) 109A, so that a device such as the controller #1 (101A) connected to it enters a state that it receives a message 906 comprising segment 1, segment 3, and segment 4 with segment 2 missing or cannot receive a message because it is not assembled.

On the other hand, the network interface apparatus 102 of the present invention has the duplicated LAN interface and the duplication control 903. This duplication control fetches only earlier arrival data judging from the sender sequence number. In this case, the LAN is duplicated, so that even if segment 2 is lost in the LAN (a) 109A, the network interface apparatus 102 in this embodiment can receive it from the other one of the LAN (b) 109B. Therefore, the controller #1 (101B) can receive a message 907 comprising all of segment 1 to segment 4 which is assembled in the network interface apparatus 102 in this embodiment. For the segments assembled actually, the LAN (a) 109A or the LAN (b) 109B, whichever the earlier, is used, so that both segments may coexist.

In this embodiment, the constitution that data is sent to both LANs of the duplicated LAN is explained. However, a constitution that one LAN is set as master, and the other LAN is set as sub, and data is sent only to the master LAN is also possible.

According to this embodiment, a controller which can have only a conventional interface such as RS-232C, SCSI, or a centronics interface can be connected to a LAN system in which the transmission line is duplicated.

Since the system is duplicated like this, the availability (probability of use of a function at a certain point of time) as a network system is improved.

For example, the availability of the LAN (a) is assumed as A1 and the availability of the LAN (b) is assumed as A2. In this case, a probability that both LANs fail is (1−A1) (1−A2). The difference obtained by subtracting this value from 1 is as follows:

$$1-(1-A1)(1-A2)=A1+A2-A1A2$$

The availability of it can be accepted by the network system.

Embodiment 2

The second embodiment of the present invention will be explained hereunder with reference to FIG. 10.

Figure 10:
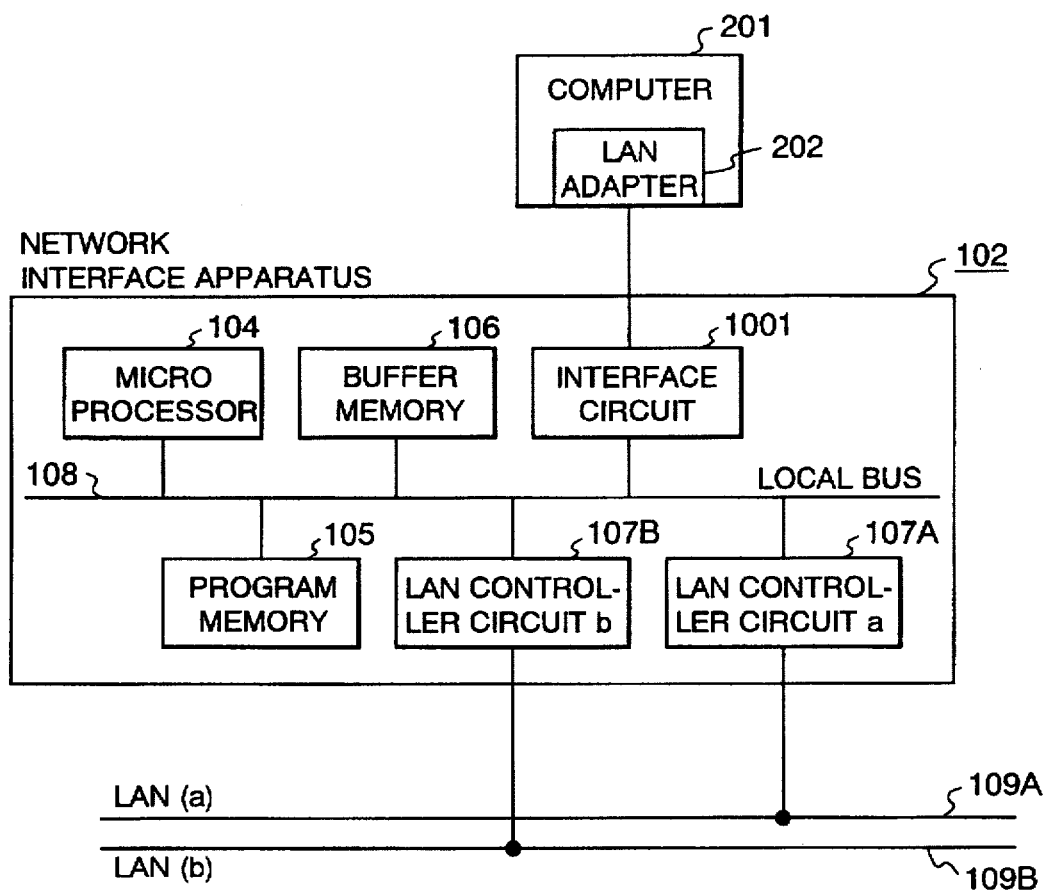
FIG. 10 is a block diagram showing the hardware constitution of the network interface apparatus in the second embodiment of the present invention.

FIG. 10 is a block diagram showing the hardware constitution of the network interface apparatus in the second embodiment of the present invention.

The network interface apparatus in the first embodiment is of a type that a controller is connected to an interface port. On the other hand, this embodiment is of a type that a computer is used as a network terminal and a LAN adapter built in the computer is connected to the network interface apparatus.

In the network interface apparatus 102 in this embodiment, instead of the interface ports 103A to 103N for sending and receiving data with the controllers 101A to 101N among the internal constitution of the apparatus in the first embodiment, an interface circuit 1001 with the LAN adapter 202 of the computer 201 is installed. Namely, it can be said that this network interface apparatus 102 can be connected to the duplicated LAN even if the computer 201 has only one LAN adapter 202.

The other configuration and the function of each module, that is, the configuration that the LAN control circuit a (107A), the LAN control circuit b (107B), the buffer memory 106, the micro processor 104, and the program memory for storing programs 105 are connected to the local bus 108 is the same as that of the first embodiment.

According to this embodiment, a computer having only one LAN interface can be connected to a LAN system in which the transmission line is duplicated.

As a result, in this embodiment, in the same way as with the first embodiment, for example, a duplicated system in which the availability of the LAN (a) 109A is A1 and the availability of the LAN (b) 109B is A2 can accept an availability of A1+A2−A1A2 as a whole system.

Embodiment 3

The third embodiment of the present invention will be explained hereunder with reference to FIG. 11.

Figure 11:
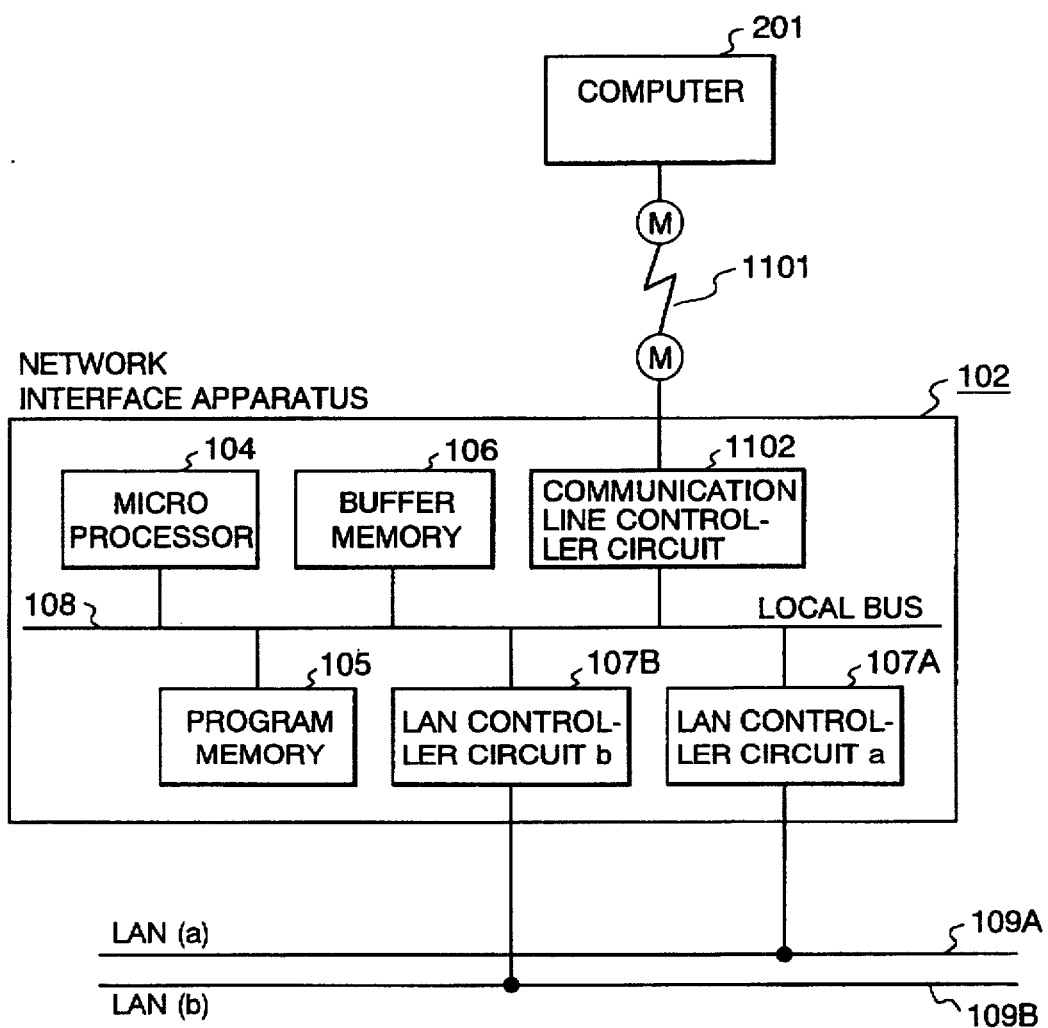
FIG. 11 is a block diagram showing the hardware constitution of the network interface apparatus in the third embodiment of the present invention.

FIG. 11 is a block diagram showing the hardware constitution of the network interface apparatus in the third embodiment of the present invention.

In the second embodiment, the network interface apparatus is connected to the LAN adapter built in the computer. However, this embodiment is of a type that the computer is connected to the network interface apparatus via a communication line.

In the network interface apparatus 102 in this embodiment, instead of the interface ports 103A to 103N for sending and receiving data with the controllers 101A to 101N among the internal constitution of the apparatus in the first embodiment and the interface circuit 1001 with the LAN adapter 202 in the second embodiment shown in FIG. 10, a communication line control circuit 1102 for connecting with a communication line 1101 is installed. Namely, this network interface apparatus 102 can be connected to the duplicated LAN even if the computer 201 which is a network terminal at a distant place has only one communication line interface.

The other configuration and the function of each module, that is, the configuration that the LAN control circuit a (107A), the LAN control circuit b (107B), the buffer memory 106, the micro processor 104, and the program memory for storing programs 105 are connected to the local bus 108 is the same as that of the first and second embodiments.

According to this embodiment, even when there is only one communication line and the computer 201 has only one communication line interface, the computer can be connected to a LAN system in which the transmission line is duplicated.

As a result, in this embodiment, in the same way as with the first and second embodiments, for example, a duplicated system in which the availability of the LAN (a) 109A is A1 and the availability of the LAN (b) 109B is A2 can accept an availability of A1+A2−A1A2 as a whole system.

The present invention can provide a network interface apparatus for connecting a network terminal such as a controller having a standard serial or parallel interface to a highly reliable system using a duplicated LAN.

The present invention can provide a network interface apparatus for connecting a computer having only one LAN interface to a highly reliable system using a duplicated LAN.

Furthermore, the present invention can provide a network interface apparatus for connecting a computer having only one communication line installed and only one communication line interface to a highly reliable system using a duplicated LAN.

We claim:

1. A network interface apparatus for connecting a network terminal and a duplicated LAN, comprising:
   means for controlling an interface with said network terminal;
   means for controlling an interface with each LAN transmission line of said duplicated LAN;
   means for buffering data from said network terminal;
   means for sending said data to each LAN transmission line from said buffering means; and
   means for sending said data received from each LAN transmission line to said network terminal,
   wherein said data from said network terminal is buffered in said means for buffering data, and when said buffered data reaches a fixed amount, said data is sent to both LANs of said duplicated LAN, and said data received from each LAN transmission line of said duplicated LAN is compared in the competition relation thereof, and only said data which is judged as earlier arrival data is sent to said network terminal, and said interface duplicated so as to connect to said duplicated LAN is controlled.

2. A network interface apparatus according to claim 1, wherein said data sent from each of said duplicated LAN is divided into several sending units, and said comparison of competition relation to be executed in said network interface apparatus is executed by the sequence number assigned to each sending unit, and these divided sending units are assembled as one united data and then sent to said network terminal.

3. A network interface apparatus according to claim 2, wherein one transmission line of said duplicated LAN and the other transmission line are classified as master and sub and sending of data to a transmission line of said duplicated LAN from said data buffering means is executed only to said transmission line classified as master.

4. A network interface apparatus according to claim 3, wherein said network terminal is a controller in a computer control system.

5. A network interface apparatus according to claim 3, wherein said network terminal contains a LAN adapter.

6. A network interface apparatus according to claim 2, wherein said network terminal is a connected to said network interface apparatus via a communication line.

7. A network interface apparatus according to claim 3, wherein said network terminal is connected to said network interface apparatus via a communication line.

8. A network interface apparatus according to claim 2, wherein said network terminal is a controller in a computer control system.

9. A network interface apparatus according to claim 2, wherein said network terminal contains a LAN adapter.

10. A network interface apparatus according to claim 1, wherein one transmission line of said duplicated LAN and the other transmission line are classified as master and sub and sending of data to a transmission line of said duplicated LAN from said data buffering means is executed only to said transmission line classified as master.

11. A network interface apparatus according to claim 10, wherein said network terminal is a controller in a computer control system.

12. A network interface apparatus according to claim 10, wherein said network terminal contains a LAN adapter.

13. A network interface apparatus according to claim 10, wherein said network terminal is connected to said network interface apparatus via a communication line.

14. A network interface apparatus according to claim 1, wherein said network terminal is a controller in a computer control system.

15. A network interface apparatus according to claim 1, wherein said network terminal contains a LAN adapter.

16. A network interface apparatus according to claim 1, wherein said network terminal is connected to said network interface apparatus via a communication line.

* * * * *